(12) United States Patent
Watanabe et al.

(10) Patent No.: US 6,529,626 B1
(45) Date of Patent: Mar. 4, 2003

(54) 3D MODEL CONVERSION APPARATUS AND METHOD

(75) Inventors: Masaki Watanabe, Kanagawa (JP); Shuichi Shiitani, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/427,932

(22) Filed: Oct. 27, 1999

(30) Foreign Application Priority Data

Dec. 1, 1998 (JP) .......................................... 10-341522

(51) Int. Cl.[7] .......................... G06T 15/00; G06K 9/00
(52) U.S. Cl. ....................... 382/154; 382/285; 345/427; 345/664; 463/32
(58) Field of Search ................................. 345/420, 672, 345/419, 147, 82, 427, 583, 664; 382/154, 285; 463/32

(56) References Cited

U.S. PATENT DOCUMENTS

| | | | | |
|---|---|---|---|---|
| 4,858,157 A | * | 8/1989 | Murai et al. ................... | 348/42 |
| 4,994,989 A | * | 2/1991 | Usami et al. ................. | 345/419 |
| 5,528,194 A | * | 6/1996 | Ohtani et al. ................ | 348/147 |
| 5,675,358 A | * | 10/1997 | Bullock et al. .............. | 345/419 |
| 5,742,294 A | * | 4/1998 | Watanabe et al. ........... | 345/672 |
| 6,081,273 A | * | 6/2000 | Weng et al. ................. | 345/420 |

FOREIGN PATENT DOCUMENTS

| JP | 4-102178 | 4/1992 | ................. 382/154 |
|---|---|---|---|

* cited by examiner

*Primary Examiner*—Brian Werner
*Assistant Examiner*—Tom Y Lu
(74) *Attorney, Agent, or Firm*—Staas & Halsey LLP

(57) ABSTRACT

The invention provides a 3D model conversion method and device, with which a precise face configuration can be performed even when there is occlusion, and which is easy to operate for the user. Based on a plurality of images, a base model defining a geometric quality of a body in the images, which is to be converted, is selected, a plurality of image calibrations is performed based on the selected base model, the base model is superimposed on the images to determine 3D coordinates of vertices of the base model, at least one new vertex is designated and a surface is configured, based on the result of the image calibrations and the previously determined 3D coordinates of the vertices of the base model, and simultaneously, 3D positional information of the new vertices is calculated, a texture image to be pasted on a surface of the 3D model is generated, based on a correspondence relation between the 3D model that is finally obtained, and data of the completed 3D model is output.

7 Claims, 18 Drawing Sheets

(a)

(b)

3D MODEL CONVERSION APPARATUS AND METHOD

BACKGROUND OF THE INVENTION

1. Field of the Invention

The present invention relates to an apparatus and a method for measuring and converting a 3D shape that can be seen in a plurality of digitalized video images or dynamic images into a 3D model to display it as computer graphics.

2. Description of the Prior Art

It is not possible to use a 3D shape that is a 2D image projected from a 3D body in a plurality of images or video images as an object for computer graphics processing, for lack of information about the length and the orientation of the shape in the 3D space. In order to make it an object for computer graphics processing, a correspondence between the images or between the video images has to be established with accuracy, and the information of 2D images has to be reconstructed as 3D information.

FIG. 1 is a flowchart of a conventional 3D model conversion method. In FIG. 1, 2D data, such as a plurality of images or dynamic images serving as the object to be converted, is given (step S101), and a calibration is performed for each of these images (step S102). Here, "calibration" means the procedure for determining the viewpoint and the viewing angle, that is, from which direction and distance the images are seen.

Then, a 2D line drawing is generated (step S103), and the correspondence of the faces enclosed by the line drawing is defined (step S104). When the correspondence of each face is clear, a 3D shape and texture can be generated (step S105), and a 3D model is outputted as the result of the specified 3D shape and texture (step S106). An input method for a 3D model using this method is known from Publication of Unexamined Japanese Patent Application (Tokkai) No. Hei 2-219010.

Moreover, as it is usually difficult to establish the correspondence between the faces, methods have been reported at various conferences, in which not the correspondence between faces but between points is designated, and such methods have been developed by many software companies. In methods in which the correspondence between points is designated, a designation of correspondences between points is performed, and it is necessary to calculate their coordinates in the 3D space before the calibration. The methods in which a point correspondence is designated can be roughly categorized in two classes: methods in which the procedure of connecting a plurality of points to designate faces is performed before the calculation of the 3D space, and methods in which this procedure is performed after the calculation of the 3D space.

FIG. 2 is a flowchart for a conventional 3D model conversion method in which the procedure of connecting a plurality of points to designate faces is performed before the calculation of the 3D space. In FIG. 2, 2D data, such as a plurality of images or dynamic images serving as the object to be converted, is given (step S201), and the correspondences between points are designated for each of these images (step S202), and faces are designated by connecting these points (step S203). This operation of designating faces is performed on the image that has been projected into a 2D plane.

Then, after configuring the faces, a 3D shape is generated by calculating the coordinates in the 3D space (step S204), and generating a texture (step S205). Finally, a 3D model is outputted as the result of the specified 3D shape and texture (step S206).

On the other hand, FIG. 3 is a flowchart for a conventional 3D model conversion method in which the procedure of connecting a plurality of points to designate faces is performed after the calculation of the 3D space. In FIG. 3, 2D data, such as a plurality of images or dynamic images serving as the object to be converted, is given (step S301), the correspondence between points is designated for each of these images (step S302), and the coordinates in the 3D space are calculated without configuring the faces (step S303). Now, each point has a 3D coordinate. The faces are designated by connecting these points.

Then, by designating faces by connecting these 3D coordinate points (step S304), a 3D shape is generated, and a texture is generated (step S305). Finally, a 3D model is outputted as the result of the specified 3D shape and texture (step S306).

However, in these methods, when an occlusion occurs between a plurality of images, the problem can occur that the shape of faces in the 2D images differs, and the correspondence between faces cannot be designated or determined correctly. Moreover, even when the correspondence between faces has been designated or determined correctly, there is still the danger that significant errors occur in the determination of the texture of the 3D shape.

Here, "occlusion" means the effect that a portion is located behind a face and cannot be seen due to the overlapping of a plurality of designated faces. For example, as shown in FIG. 4, if the portion indicated by bold lines is converted into a 3D model by using two cameras, camera 1 detects a medium-dark portion located between a bright portion and a dark portion, as shown in FIG. 5(a). On the other hand, camera 2 detects only the bright portion and the dark portion, as shown in FIG. 5(b), whereas the medium-dark portion is in the dead angle (occluded) and therefore cannot be detected. In this case, point A rises upward in the detected 3D shape in the view of camera 2 as shown in FIG. 6, or in other words, point A is mistaken for point A', and a correct shape recognition is not possible.

Moreover, also in the methods for designating the correspondence between points, in the method in which the procedure for designating a face by connecting a plurality of points is performed before the calculation of the 3D space, the arrangement in the 3D space is not yet decided at the time of configuration of the faces, so that the user has to configure the faces while imagining the 3D space, and the more complicated the faces are, the higher is the probability that the face configuration will differ from the real face configuration.

Moreover, in the method in which the procedure for designating a face by connecting a plurality of points is performed after the calculation of the 3D space, a group of points arranged in the 3D space is displayed on a 2D display device, such as a display, so that the more points there are, the more difficult it is for the user to discriminate each point, and the larger is the possibility that a precise face configuration is not possible.

SUMMARY OF THE INVENTION

It is an object of the present invention to solve these problems, and to provide a 3D model conversion apparatus and method with which a precise face configuration can be performed even when there is occlusion, and which is easy to operate for the user.

In order to achieve this object, a 3D model conversion apparatus for measuring the shape of a 3D body, based on a plurality of images and converting it into a 3D model, comprises:

an image input portion for reading in a plurality of the images;

an image storing portion for storing the images that have been read in;

a base model memory portion for storing base models expressing reference bodies included in the images;

a base model selecting portion for selecting a base model defining a geometric quality of a body in the images, which is to be converted;

an image calibration portion for performing a plurality of image calibrations based on the selected base model, and superimposing the base model on the images to determine 3D coordinates of vertices of the base model;

a face configuration and corresponding points designating portion for designating at least one new vertex and configuring a surface, based on the result of the image calibrations and the previously determined 3D coordinates of the vertices of the base model;

a 3D information calculation portion for calculating 3D positional information of the new vertices when the new vertices are being designated;

a 3D shape display portion for displaying a 3D model of the body, which is to be converted;

a texture image generating portion for generating a texture image to be pasted on a surface of the 3D model, based on a correspondence relation between the 3D model that is finally obtained by addition of the new vertices and the images;

a generated model output portion for outputting data of the completed 3D model.

With this configuration, the user can ascertain visually the state of the 3D model that is being generated, so that a 3D model can be constructed as intended by the user, and a faulty recognition of the 3D model due to occlusion can be avoided.

Next, to achieve the above-noted object, a computer-readable recording medium stores a program for execution on a computer for measuring the shape of a 3D body based on a plurality of images and converting it into a 3D model. The program includes:

reading in a plurality of the images, and storing the images that have been read in;

storing base models expressing reference bodies included in the images;

selecting a base model defining a geometric quality of a body in the images, which is to be converted;

performing a plurality of image calibrations based on the selected base model, and superimposing the base model on the images to determine 3D coordinates of vertices of the base model;

designating at least one new vertex and configuring a surface, based on the result of the image calibrations and the previously determined 3D coordinates of the vertices of the base model, and simultaneously calculating 3D positional information of the new vertices and displaying a 3D model of the body, which is to be converted;

generating a texture image to be pasted on a surface of the 3D model, based on a correspondence relation between the 3D model that is finally obtained by addition of the new vertices and the images; and outputting data of the completed 3D model.

With this configuration, by loading and executing this program on a computer, the user can ascertain visually the state of the 3D model that is being generated, so that a 3D model conversion apparatus can be realized, with which a 3D model can be constructed as intended by the user, and a faulty recognition of the 3D model due to occlusion can be avoided.

DESCRIPTION OF THE PREFERRED EMBODIMENTS

Figure 1:
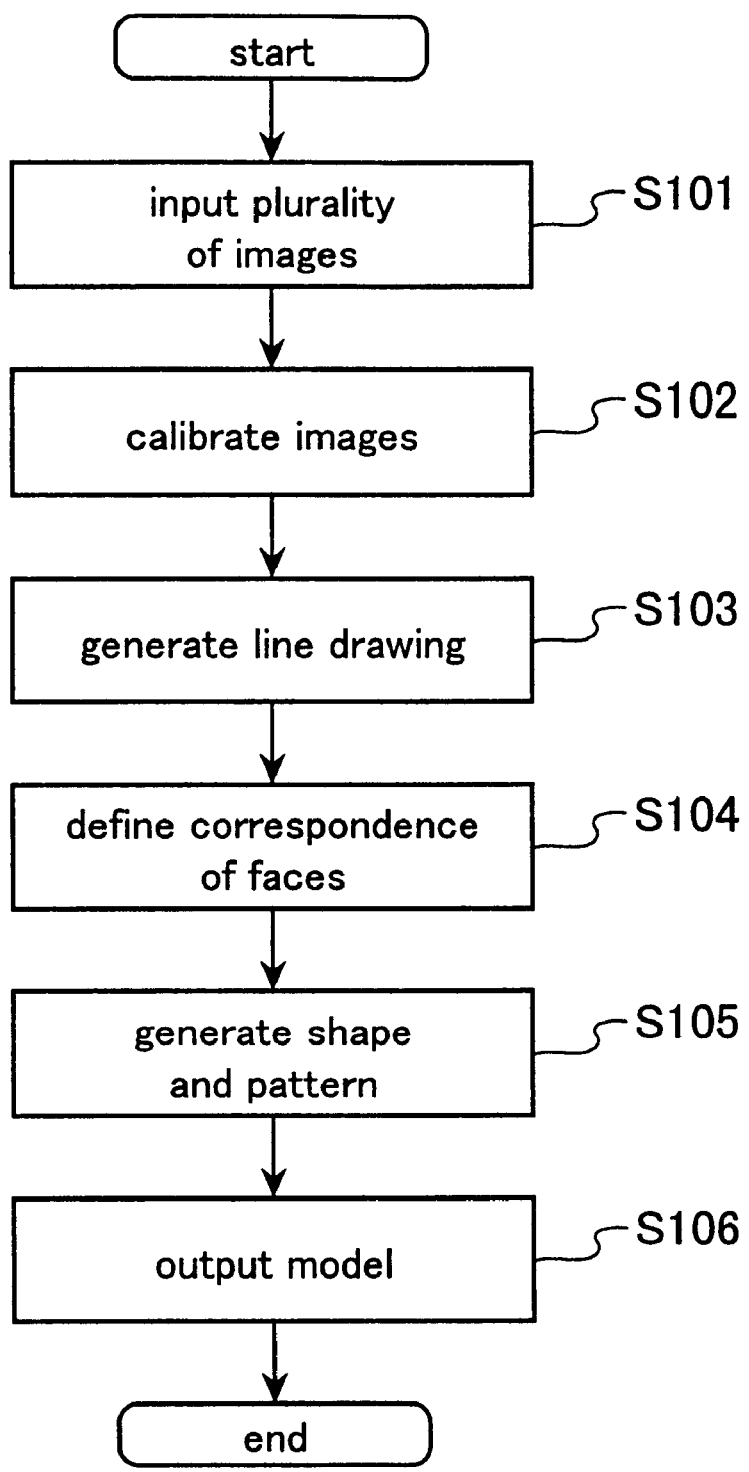
FIG. 1 is a flowchart for a conventional 3D model conversion method.
Figure 2:
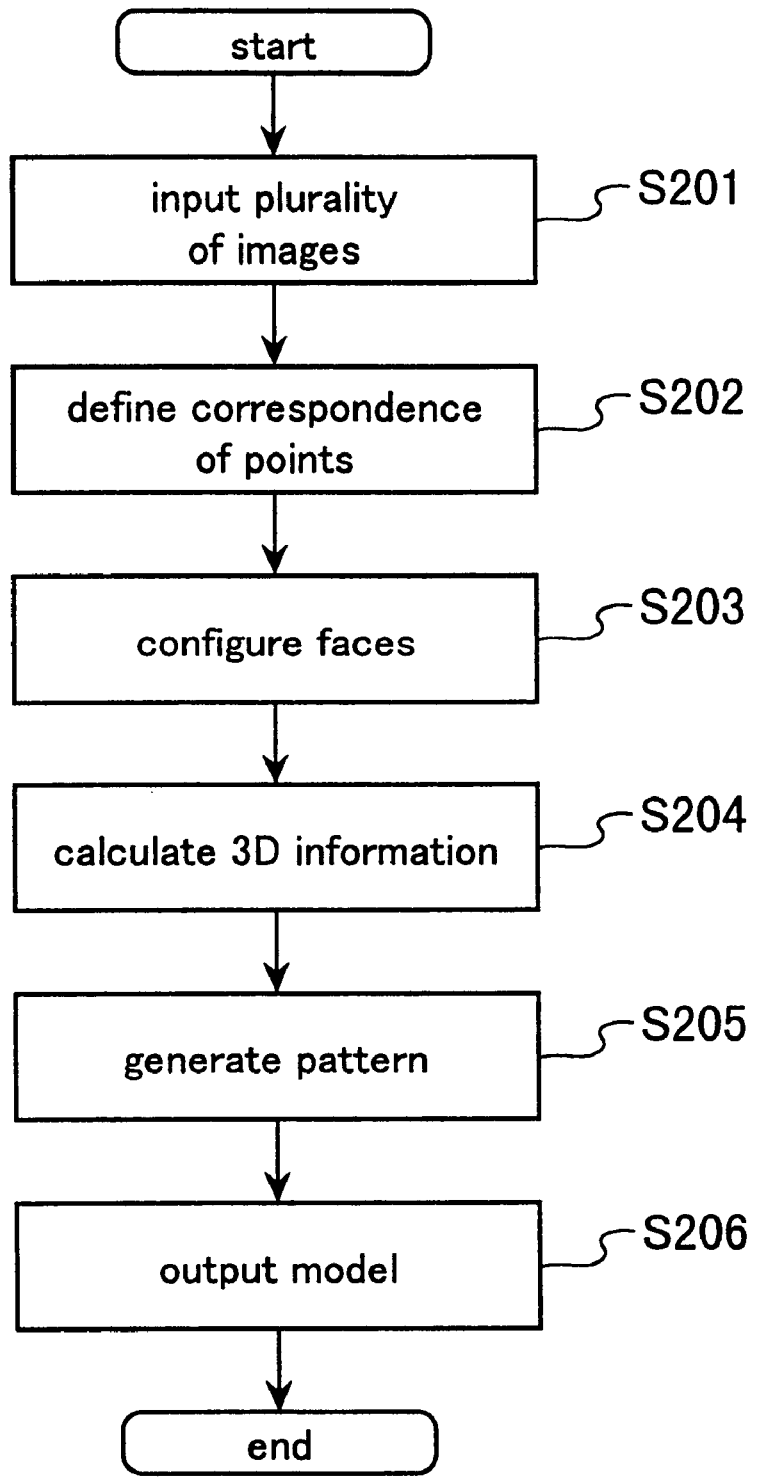
FIG. 2 is a flowchart for a conventional 3D model conversion method, in which the procedure of connecting a plurality of points to designate faces is performed before the calculation of the 3D space.
Figure 3:
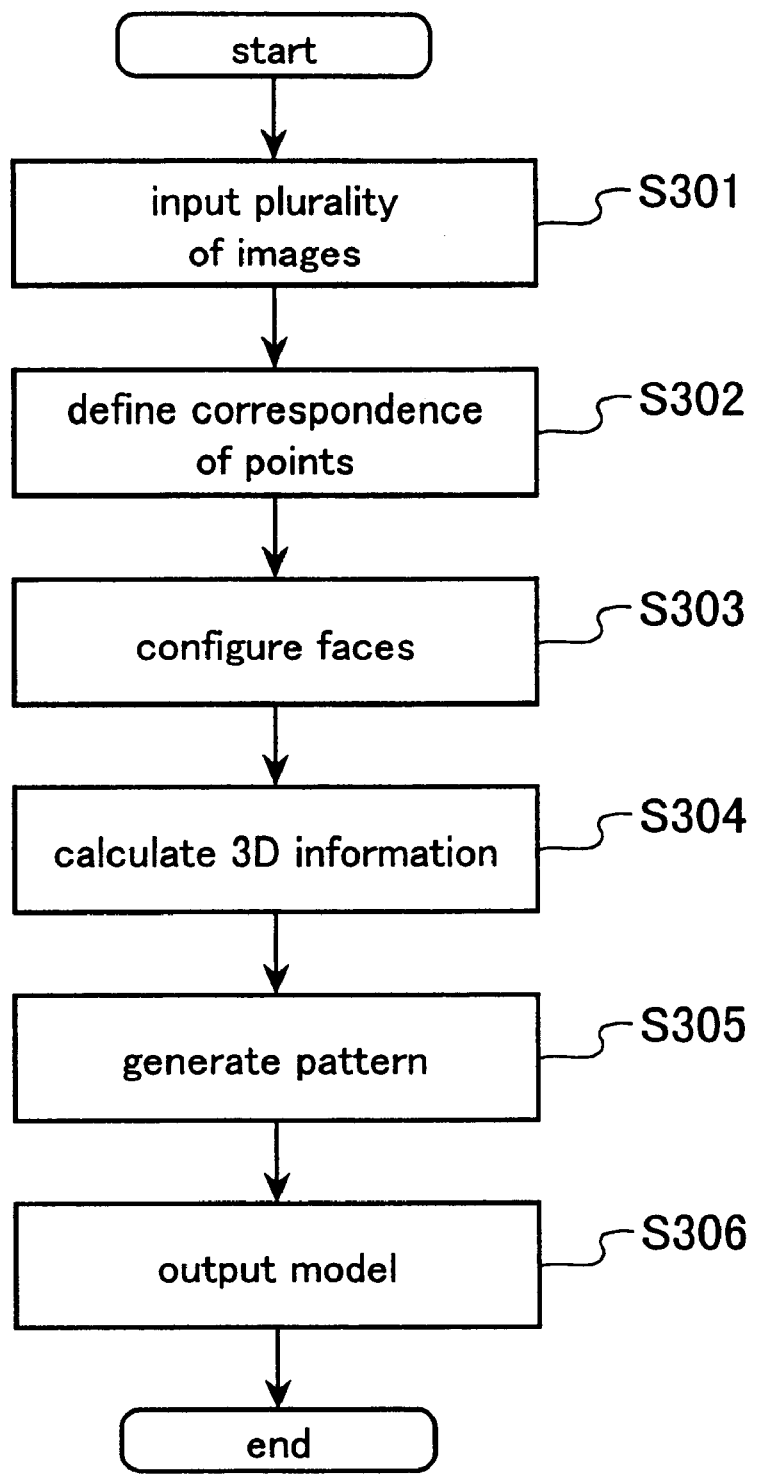
FIG. 3 is a flowchart for a conventional 3D model conversion method, in which the procedure of connecting a plurality of points to designate faces is performed after the calculation of the 3D space.
Figure 4:
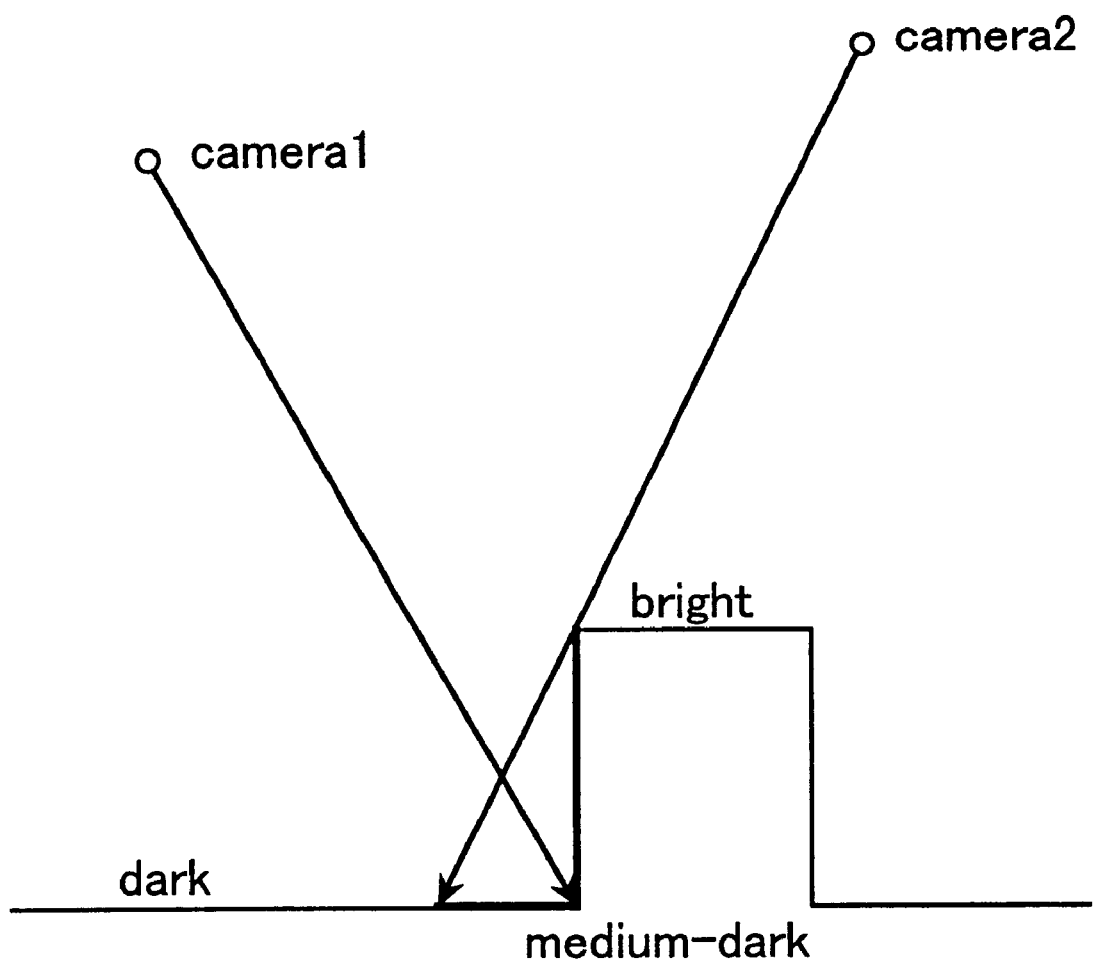
FIG. 4 is an illustrative diagram of occlusion.
Figure 5:
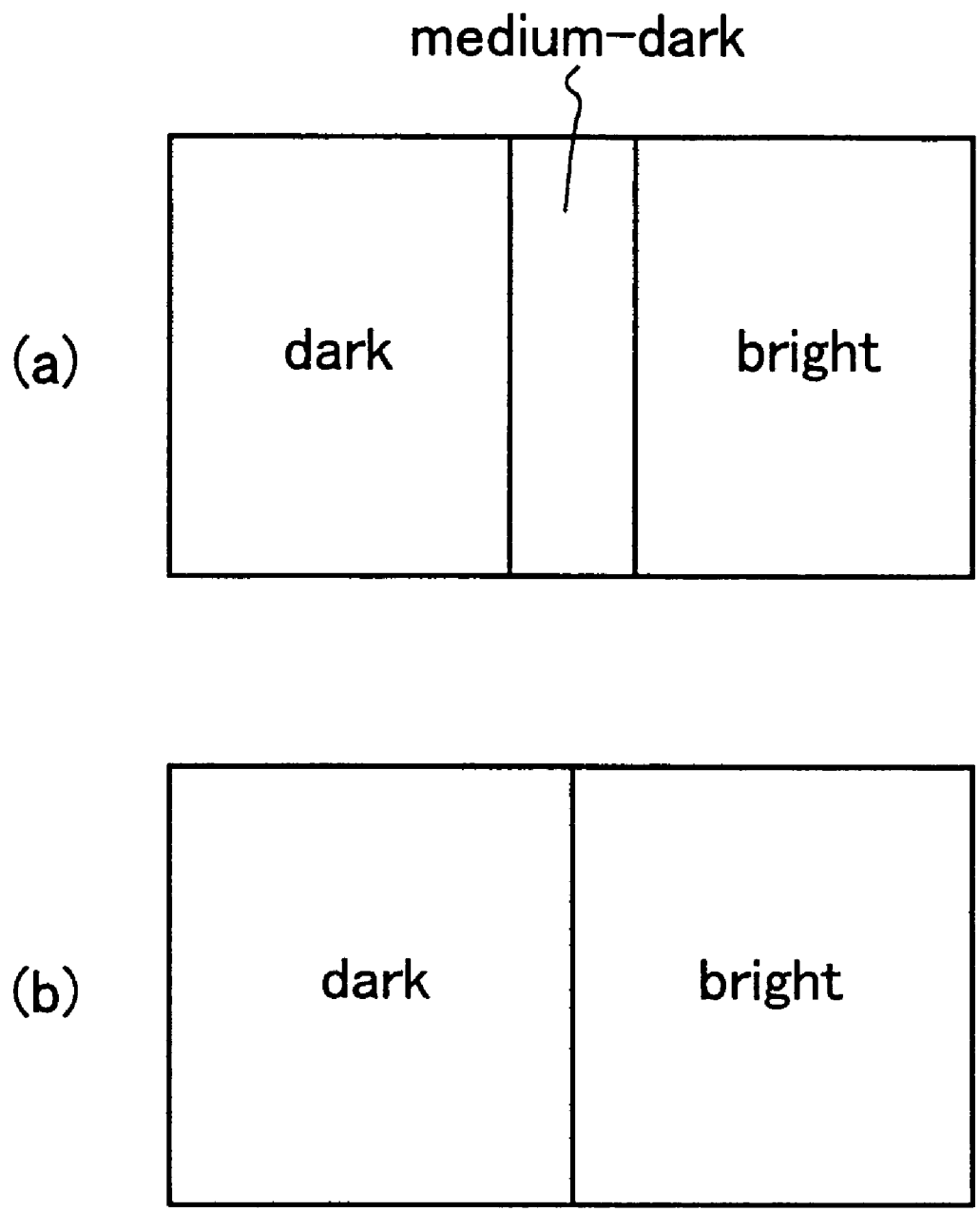
FIG. 5 is an illustrative diagram of how the projection differs according to the viewpoint.
Figure 6:
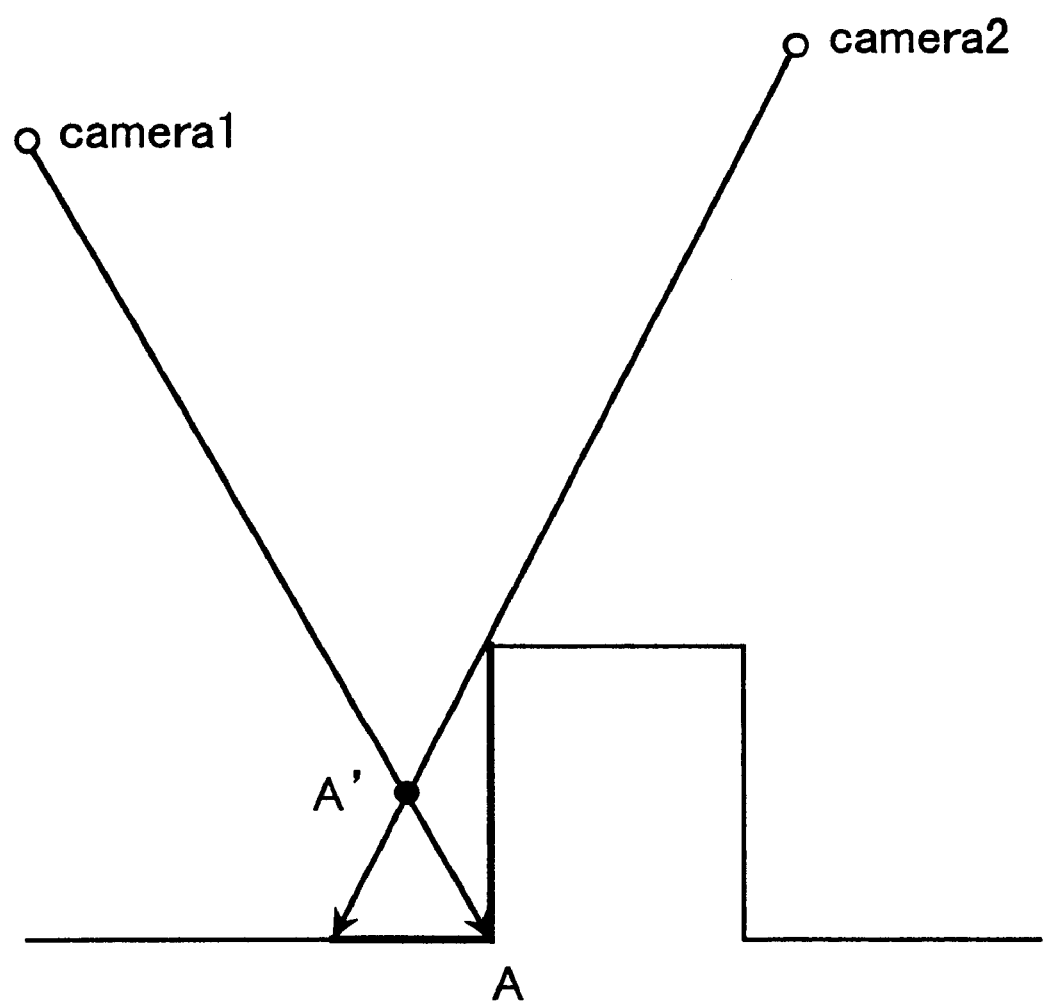
FIG. 6 is an illustrative diagram of how a 3D shape is generated due to occlusion.
Figure 7:
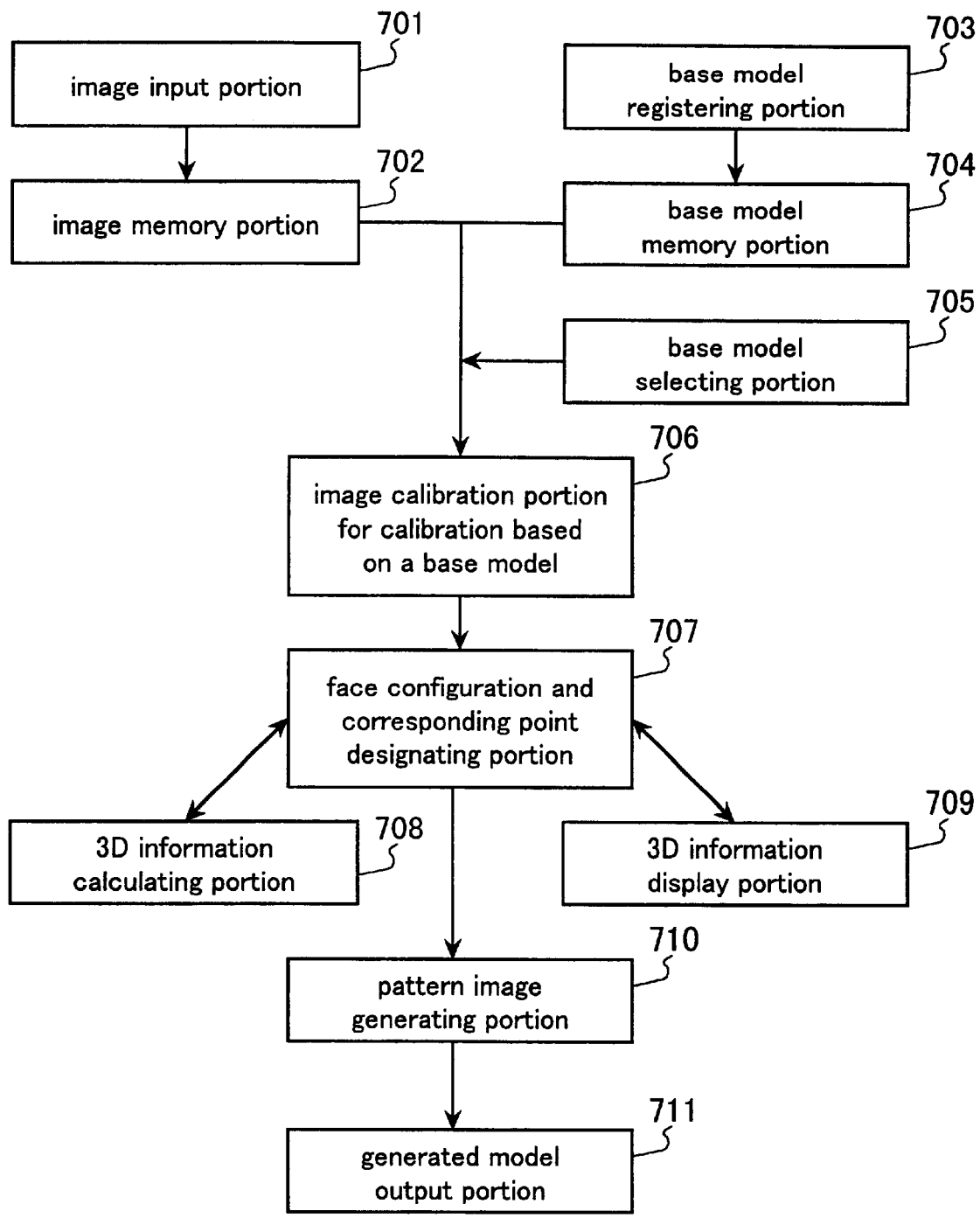
FIG. 7 is a block diagram of an embodiment of a 3D model conversion apparatus in accordance with the present invention.

The following is an explanation of an embodiment of a 3D model conversion apparatus in accordance with the present invention, with reference to the accompanying drawings. FIG. 7 is a block diagram illustrating an embodiment of a 3D model conversion apparatus in accordance with the present invention.

In FIG. 7, numeral 701 denotes an image input portion, numeral 702 denotes an image storing portion, numeral 703 denotes a base model registering portion, numeral 704 denotes a base model memory portion, numeral 705 denotes a base model selecting portion, numeral 706 denotes an image calibration portion for calibration based on a base model, numeral 707 denotes a face configuration and corresponding points designating portion, numeral 708 denotes a 3D information calculating portion, numeral 709 denotes a 3D information display portion, numeral 710 denotes a texture image generating portion, and numeral 711 denotes a generated model output portion.

A plurality of images is read as video images or still images from the image input portion 701 into the image storing portion 702 with an image input device or the like. Suitable image input devices include electronic still cameras and digital video cameras, but there is no particular limitation to these.

On the other hand, 3D model information of bodies that are regarded as objects of the base model is entered into the base model registering portion 703, and stored in the base model memory portion 704. A base model includes 3D coordinates of vertices and graphs between the vertices. Next, in a base model selecting portion 705, the user selects the 3D model that fits best to a portion used as a basis for calibration in the target image, from a group of models stored in the base model memory portion 704.

Then, in the image calibration portion 706 for calibration based on a base model, by performing the calibration of the target image and by determining external and internal camera parameters of the image, it is determined how the faces included in the base model are arranged in the image. Here, "external camera parameters" means position and orientation of a camera, and are the parameters that map out the view point for viewing the target image. "Internal camera parameters" refers to focal distance and distortion, and these are the parameters that are used for fine-tuning when making the 3D model of the target image.

Then, in the face configuration and corresponding points designating portion 707, the user designates the points of the image for which to establish a correspondence relation with the base model, and faces are formed by connecting these designated points with a plurality of arbitrary points in the base model. Consequently, the points for which to establish a correspondence relation become vertices that are newly added to the base model. This operation is performed for all given images.

Then, the 3D information calculating portion 708 calculates the 3D coordinates for the points that have been designated in the image by the face configuration and corresponding points designating portion 707. This calculation is based on the principle of triangulation. Consequently, each point has to be designated on at least two images. If a point is designated on only one image, it is given a virtual 3D coordinate.

The 3D information display portion 709 displays the 3D shape of the body that has been formed by adding the new points, based on (i) face configuration information that has been determined with the face configuration and corresponding points designating portion 707 and (ii) 3D positional information of the designated points that have been calculated with the 3D information calculating portion 708. By displaying, the user can verify whether the configuration of the new vertices and faces agrees with the one that he intended. If it does not agree with the intended configuration, the user can go back to the face configuration and corresponding points designating portion 707 and make corrections. The above process is repeated until the desired number of vertices and the desired face information have been generated.

Finally, the texture image generating portion 710 generates a texture image to be pasted onto the surface of the 3D model, based on the correspondence relation between the final 3D model and the image. The generated model output portion 711 outputs the generated model after conversion into a data format for a 3D model display system.

Figure 8:
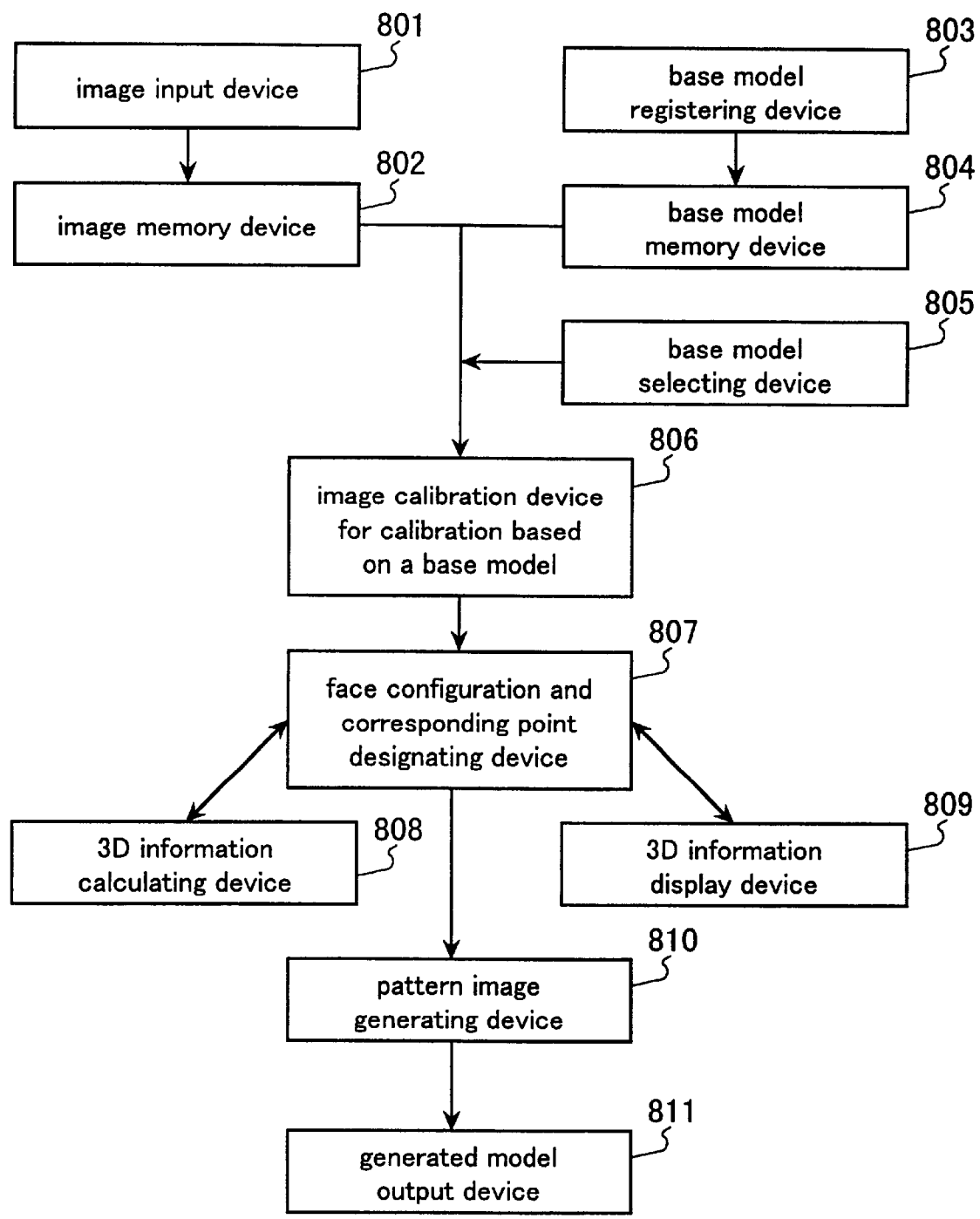
FIG. 8 is a block diagram of an example of a 3D model conversion apparatus in accordance with the present invention.

The following is an explanation of an example of a 3D model conversion apparatus in accordance with the present invention, with reference to the accompanying drawings. FIG. 8 is a block diagram illustrating a 3D model conversion apparatus in accordance with this example.

In FIG. 8, numeral 801 denotes an image input device, numeral 802 denotes an image storing device, numeral 803 denotes a base model registering device, numeral 804 denotes a base model storing device, numeral 805 denotes a base model selecting device, numeral 806 denotes an image calibration device for calibration based on a base model, numeral 807 denotes a face configuration and corresponding point designating device, numeral 808 denotes a 3D information calculating device, numeral 809 denotes a 3D information display device, numeral 810 denotes a texture image generating device, and numeral 811 denotes a generated model output device.

In FIG. 8, an image is input into the image input device 801, using a video camera or a CCD camera for example. In the case of a video image, it does not matter whether the image is broken down into frames or not. However, it is necessary to provide a function with which a frame can be specified according to user instructions, since it is necessary to specify a target frame to perform the calibration of the image with the image calibration device 806 for calibration based on the base model. This function should be equivalent to a single-frame display function as in commercial video decks.

The previously input image is read from the image input device 801 into the image storing device 802. The image storing device 802 can be a storage medium, for which magnetic disk devices are prominent examples, but there is no particular limitation.

On the other hand, 3D model information of bodies that are regarded as objects of the base model is entered into the base model registering device 803, and stored in the base model storing device 804. As the image storing device 802, the base model storing device 804 can be a storage medium, for which magnetic disk devices are prominent examples, but there is no particular limitation.

Models of 3D shapes, such as rectangular solids, cones, columns, spheres etc., are provided as base models for realizing the target object. There is no limitation to these shapes in the use for the base model, and it is also possible to combine more than one of those shapes into a compound shape.

The base model is expressed entirely in polygons. Consequently, similarly as for the data format in conventional CG (computer graphics), the model, is expressed by 3D coordinates in a 3D model coordinate system.

For example, if a rectangular solid is used for the base model, its eight vertices can be expressed in 3D coordinates as (0, 0, 0), (1, 0, 0), (0, h, 0), (1, h, 0), (0, 0, d), (1, 0, d), (0, h, d), and (1, h, d). Here, "h" and "d" are variables; "h" expresses the height, and "d" expresses the depth of the rectangular solid. Determining "h" and "d" determines the shape of the target body serving as the rectangular solid model.

In the case of a regular n-sided prism, the base model can be defined by $(\cos(2\pi i/n), \sin(2\pi i/n), 0)$, $(\cos(2\pi i/n), \sin(2\pi i/n), d)$ (wherein i is an integer with i=0 ... n−1). In the case of a regular n-sided pyramid, the base model can be defined by $(\cos(2\pi i/n), \sin(2\pi i/n), 0)$ and $(0, 0, d)$ (wherein i is an integer with i=0 ... n−1). In both cases, determining "d" determines the shape of the target body serving as the base model. Also for other base models, providing parameter variables similar to "d" and "h" determines the shape of the body serving as the rectangular solid model.

Each vertex has a vertex number for identification. And, each face of the model can be expressed with a graph of vertex numbers. Each face is defined by 4 vertices. Therefore, if in model that is a rectangular solid, the vertex numbers 0: (0,0,0), 1: (1,0,0), 2: (0,h,0), 3: (1,h,0), 4: (0,0,d), 5: (1,0,d), 6: (0,h,d), and 7: (1,h,d) are assigned to the vertices, each face can be expressed by assigning a face number and expressing the faces as 0: 0-1-3-2, 1: 4-5-7-6, 2: 0-1-5-4, 3: 2-3-7-6, 4: 0-2-64, and 5: 1-3-7-5.

Data with this format is read in as base model information serving as the registration information for the base model. Since this format follows the notation for regular CG models, it is possible to read various types of data formats by providing a data conversion tool that can convert all kinds of CG model expression formats. Providing a function for freely viewing the inputted model on the screen, and a function for designating a portion to be parametrized using a pointing device, such as a mouse, it is easy to fetch the most suitable base model.

Next, in the base model selecting device 805, the user selects, from a model group stored in the base model storing device 804, the 3D model that fits best to a portion used as a basis for calibration in the target image.

Figure 9:
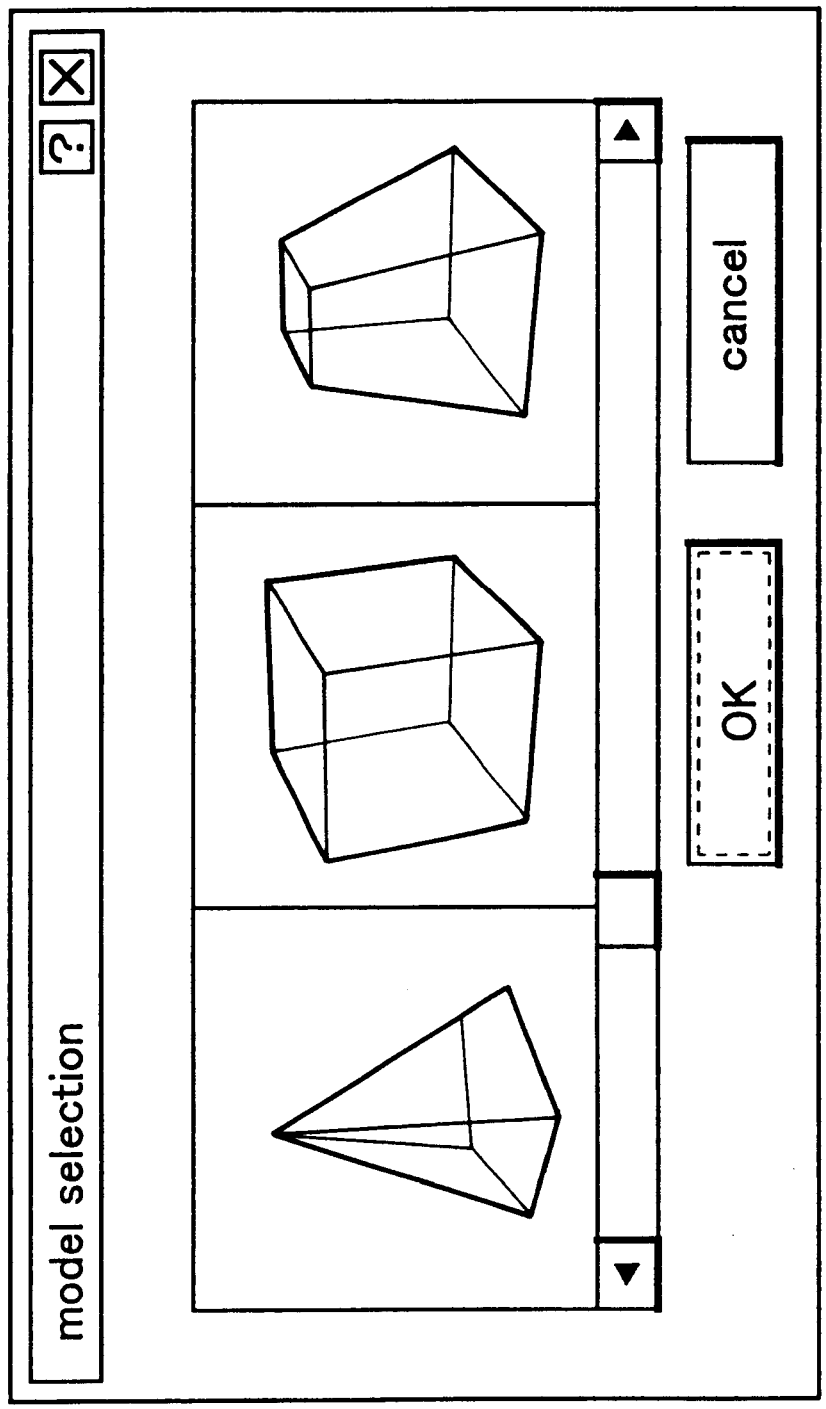
FIG. 9 is an example of a base model selection instruction window in an example of a 3D model conversion apparatus in accordance with the present invention.

FIG. 9 shows an example of a window for instructing the base model selection. When there is a plurality of video images for example, it is advantageous that the user can use this interface to make a selection while viewing.

Then, in the image calibration device 806 for calibration based on a base model, by performing the calibration of the target image and determining external and internal camera parameters of the corresponding image, it is determined how the faces included in the base model are arranged in the corresponding image. Here, "external camera parameters" means position and orientation of a camera, and are the parameters that map out the view point of the target image. "Internal camera parameters" refers to focal distance and distortion, and these are the parameters that are used for fine-tuning when making the 3D model of the target image.

The calibration based on the base model is performed in the following order. The vertices in the base model and the coordinates in the image into which the vertices are projected are connected in all given images. The information correlating the vertices in this base model to the coordinates in the images gives rise to a system of linear equations. The external camera parameters and the internal camera parameters for all given images can be obtained by solving this system of linear equations. If the base model itself is expressed by parameters, it is sufficient if these parameters are added as variables to the above-noted system of linear equations and the system of linear equations is solved.

With this process, the position of the viewpoint can be determined for each of the given images, and it becomes possible to derive a glance-line equation for any arbitrary point on the images, so that by specifying a point on the images, its coordinates in the 3D space can be calculated.

Figure 10:
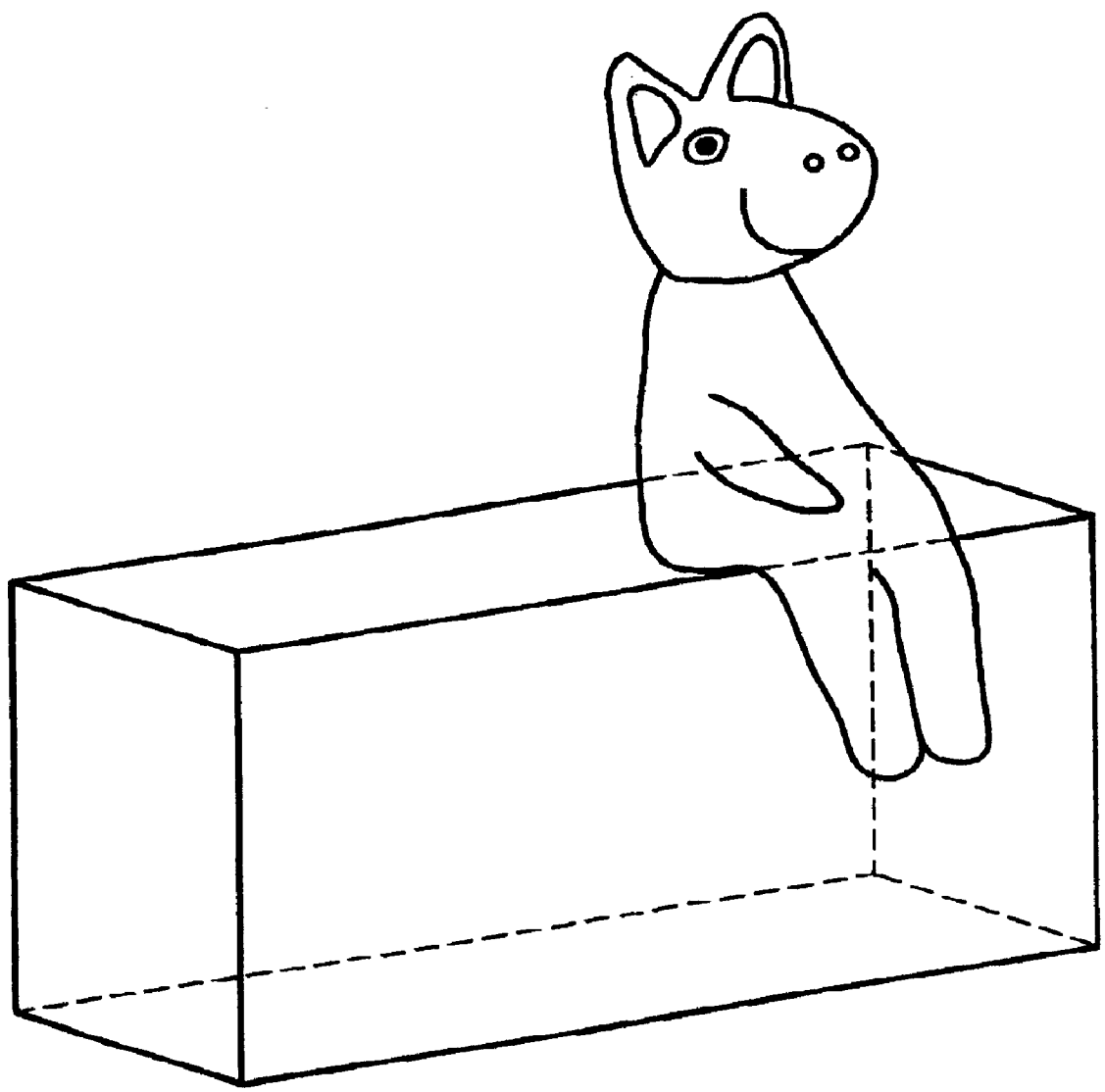
FIG. 10 is an example of a finished calibration in an example of a 3D model conversion apparatus in accordance with the present invention.

Then, based on the result of the calibration, by overlap-displaying the base model on the images, the vertices and faces in the images can be discriminated. For example, in an image where a puppet sits on a box, which is a rectangular solid, as shown in FIG. 10, a rectangular solid can be chosen as the base model, and after the calibration, the base model is overlap-displayed on the rectangular box, on which the puppet sits.

Then, in the face configuration and corresponding point designating device 807, the user designates the points of the image for which to establish a correspondence relation with the base model, and faces are formed by connecting these designated points with vertices of the faces including these points in the base model. Consequently, the points for which to establish a correspondence relation become vertices that are newly added to the base model. This operation is performed for all given images whose vertices can be observed on at least two images.

Then, the 3D information calculating device 808 calculates the 3D coordinates for the points that have been designated in the images by the face configuration and corresponding point designating device 807. This calculation is based on the principle of triangulation. If a point is designated on only one image, it is given a virtual 3D coordinate.

The 3D information display device 809 displays the 3D shape of the body that has been formed by adding the new points, based on (i) face 1T configuration information that has been determined by the face configuration and corresponding point designating device 807 and (ii) 3D positional information of the designated points that have been calculated by the 3D information calculating device 808. By displaying, the user can verify whether the configuration of the new vertices and faces agrees with the one that was intended. If it does not agree with the intended configuration, the user can go back to the face configuration and corresponding point designating device 807 and make corrections by redoing the configuration of the corresponding points and face. The above process is repeated until the desired number of vertices and the desired face information has been generated.

Figure 11:
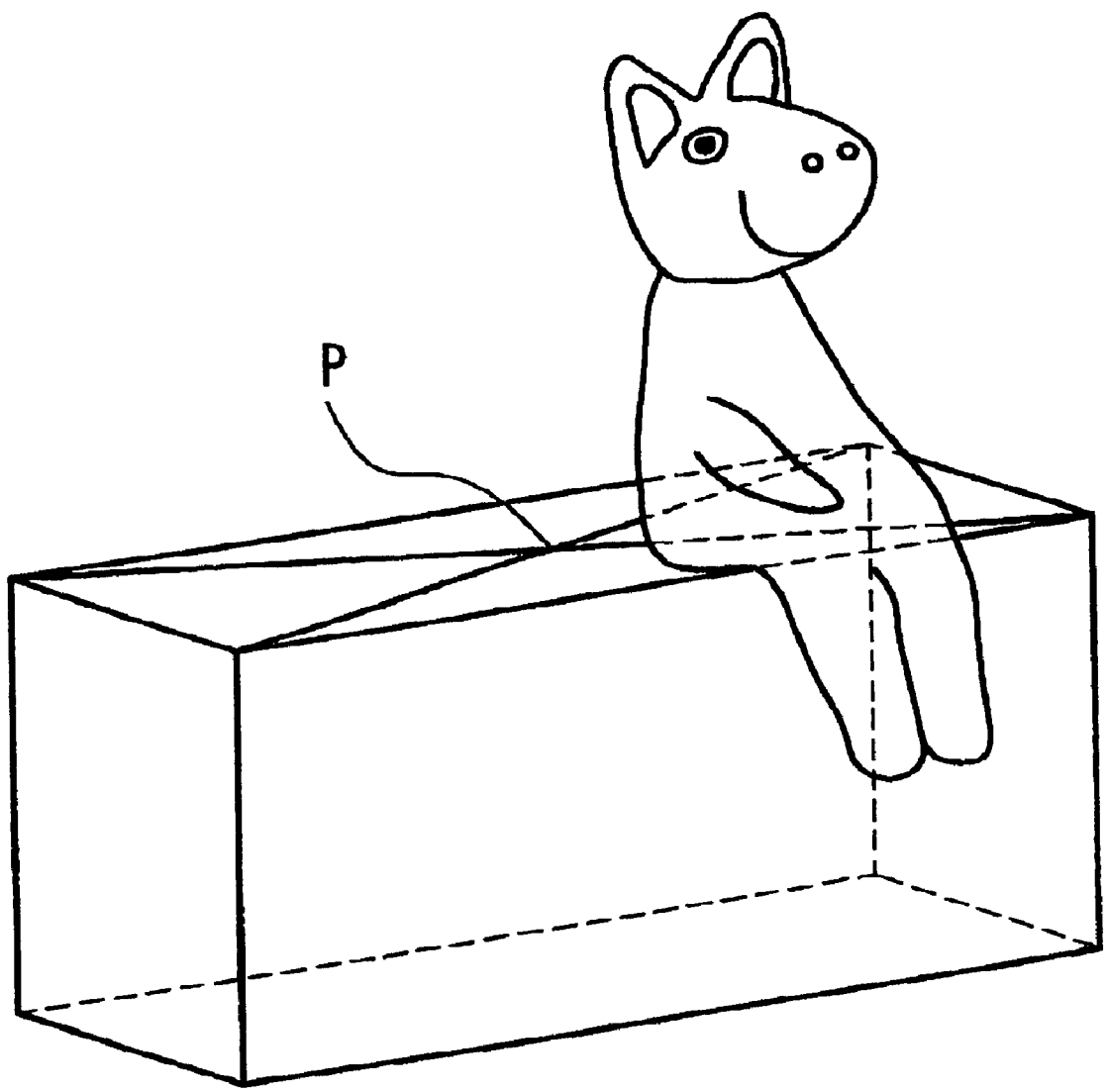
FIG. 11 is an example of a new vertex designation in an example of a 3D model conversion apparatus in accordance with the present invention.

In particular, this process is performed by designating a point inside a face or in the middle of an edge with which the base model is projected in the given images. For example, in FIG. 11, a new vertex P can be designated in the upper face of the rectangular solid on which the puppet is sitting. When the new vertex P is designated, face information can be set temporarily by connecting the designated vertex P with the vertices of the face including the vertex P. In FIG. 11, the designated point P on the upper face of the rectangular solid is connected to the vertices of the upper face of the rectangular solid.

If a newly designated vertex is located on an edge, the face information can be set temporarily by connecting the new vertex with all the vertices of the two faces sharing this edge. The setting of a new vertex can be performed easily by selection with a pointing device, for example a mouse.

Figure 12:
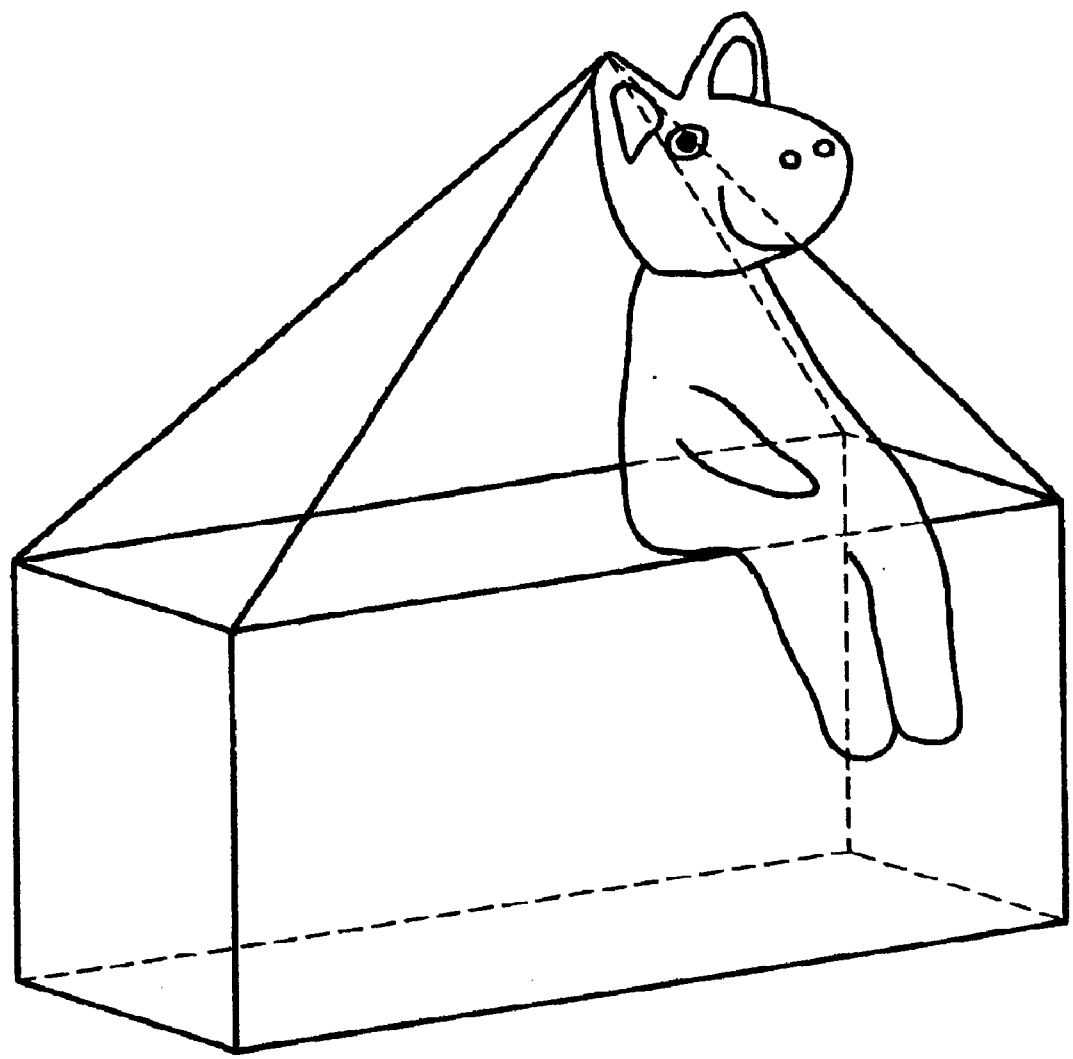
FIG. 12 is an example of a new vertex designation in an example of a 3D model conversion apparatus in accordance with the present invention.

When the face information is set temporarily, the new vertex can be shifted to any desired position on the images. This shifting can be performed by drag-and-drop with a regular pointing device, for example a mouse. For example, in order to designate the new vertex as the tip of the puppet's ear in FIG. 12, the new vertex that has been designated on the upper face of the rectangular solid is dragged with a pointing device (for example a mouse) and when it has been shifted to the tip of the puppet's ear, it is dropped. Thus, the tip of the puppet's ear can be set as the target for the 3D coordinate calculation.

Figure 13:
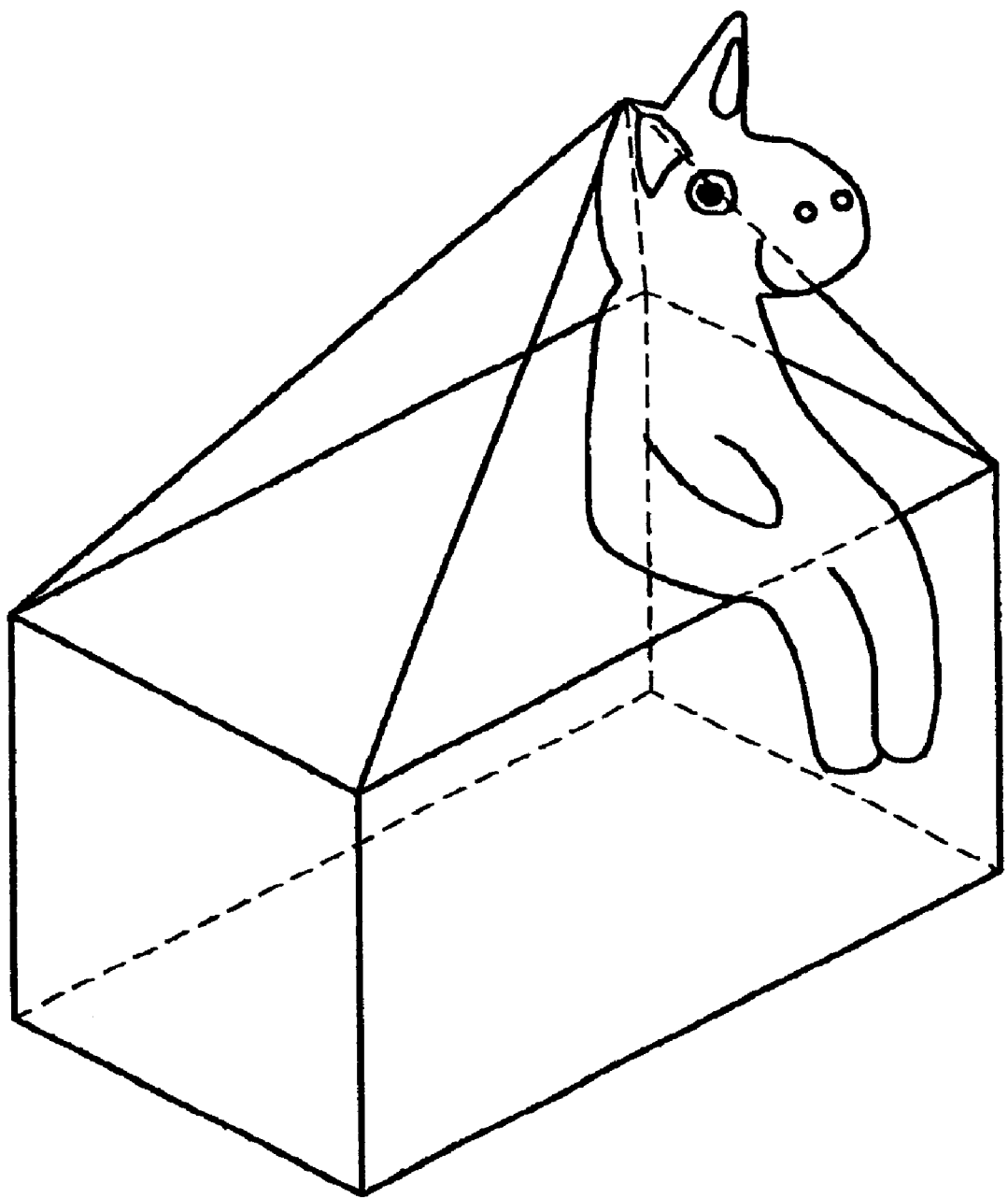
FIG. 13 is an example of a new vertex designation in an example of a 3D model conversion apparatus in accordance with the present invention.

The setting of new vertices has to be performed in at least two images, because the 3D coordinates are calculated by triangulation. Consequently, in addition to the settings for the image as seen from the viewpoint in FIG. 12, it is necessary to move the position of a new vertex to the tip of the puppet's ear by drag-and-drop in FIG. 13, which is taken from a different viewpoint, as well.

Figure 14:
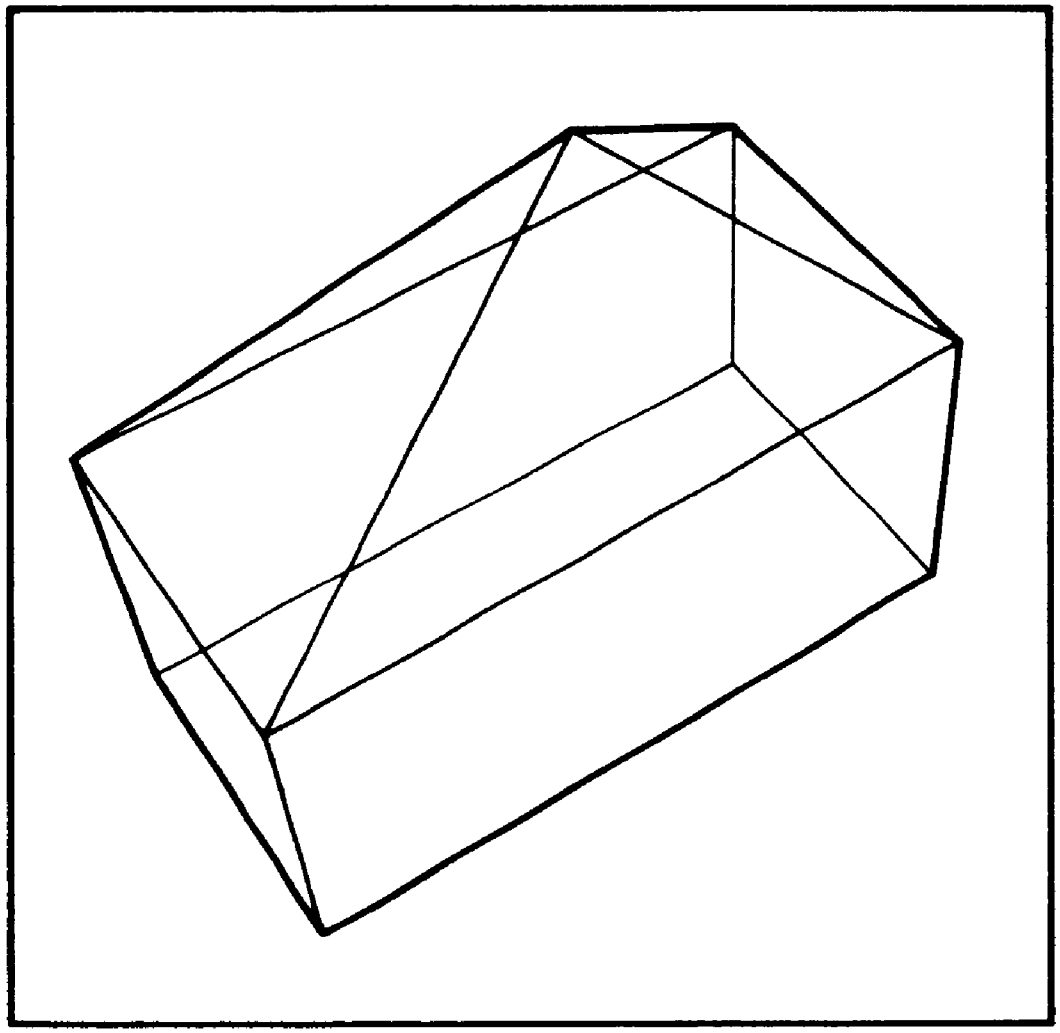
FIG. 14 shows how a 3D shape is displayed in an example of a 3D model conversion apparatus in accordance with the present invention.

The calculation of the 3D coordinates when the new vertex has been moved to the desired position is performed by coupling the glance-line equations for all images and solving the resulting equation, based on the results of the calibration. The calculated 3D coordinates are displayed as polygons, as shown in FIG. 14. The reason for employing this display function is that the 3D model that is established on the basis of the images can be evaluated independently from the images, and it can be verified by rotation of the 3D model whether the generated 3D model is as desired.

Figure 15:
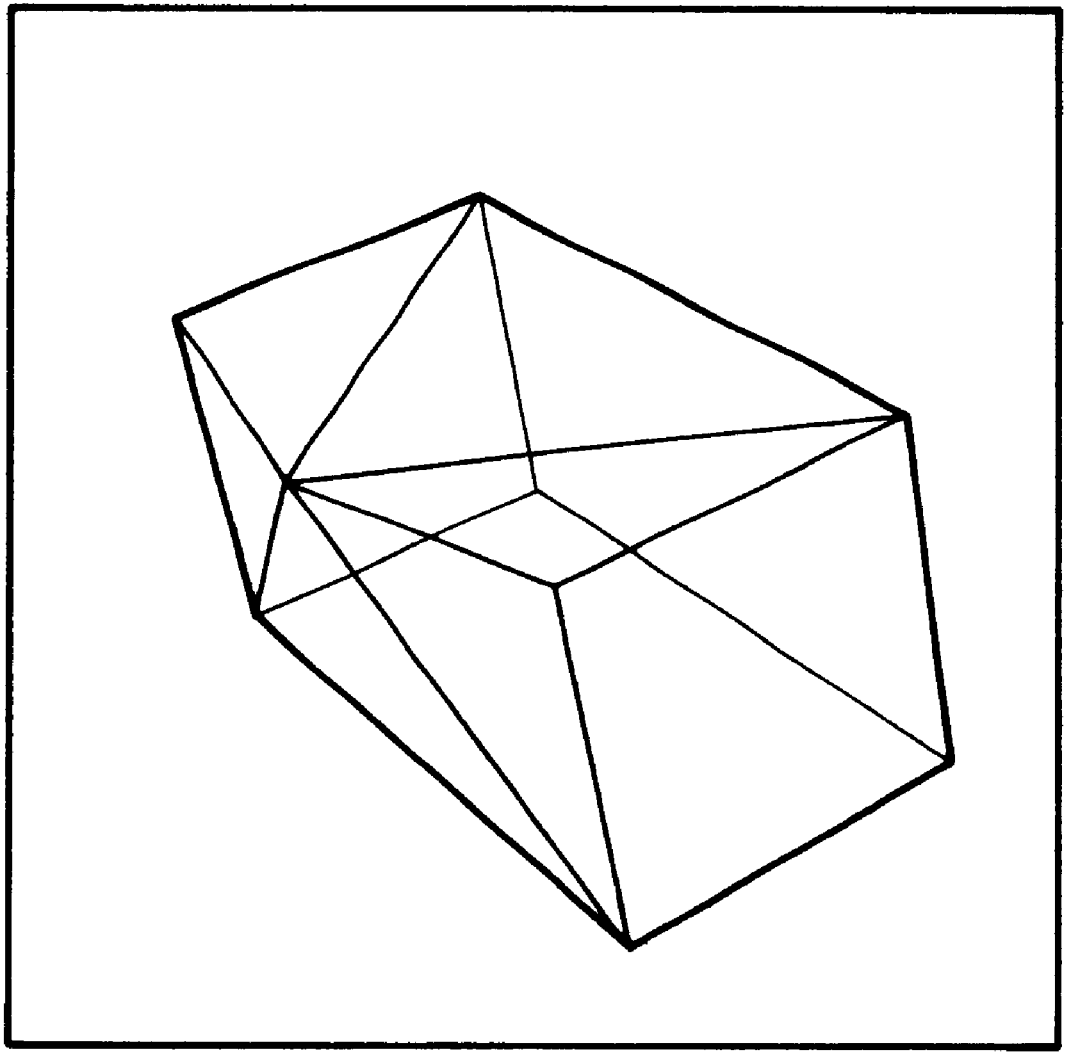
FIG. 15 shows how a 3D shape is displayed in an example of a 3D model conversion apparatus in accordance with the present invention.

This display function can also be used when the face information has been set temporarily. For example, when a new point is designated on an edge of a rectangular solid, it is possible to display a 3D model as shown in FIG. 15.

If the generated 3D model is not as desired, the 3D model also can be changed by correcting the position of an edge. For example, if an edge is designated, and the other vertices of the two adjacent faces sharing this edge are connected, the two adjacent faces based on the newly positioned edge are redefined by connecting the other vertices of the two adjacent faces. If the two adjacent faces sharing the edge are triangular, the newly positioned edge can be specified unequivocally, and it is also possible to specify how the faces are defined.

Figure 16:
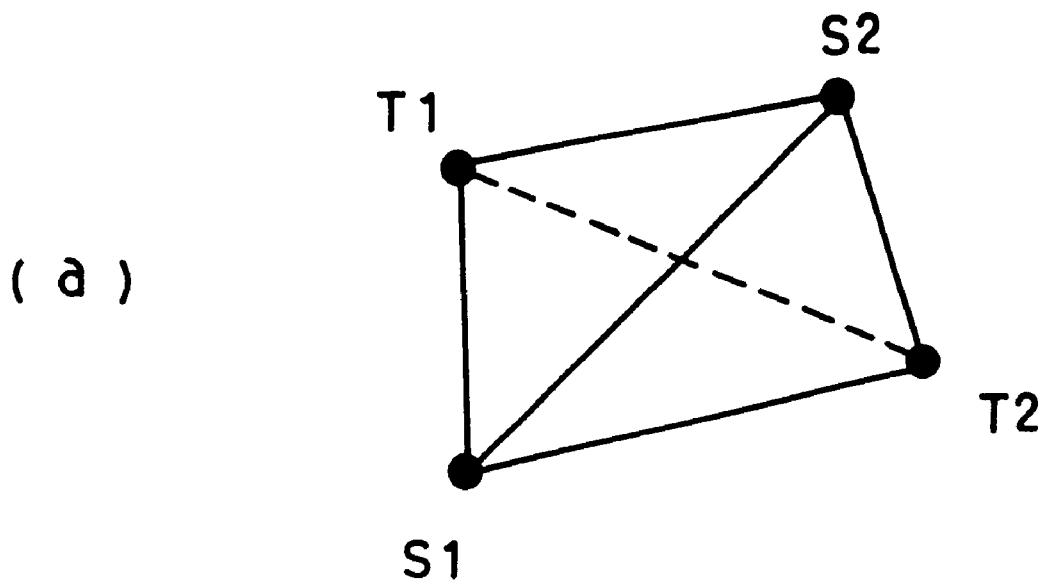
FIG. 16 illustrates a method for changing a 3D model in an example of a 3D model conversion apparatus in accordance with the present invention.
Figure 16:
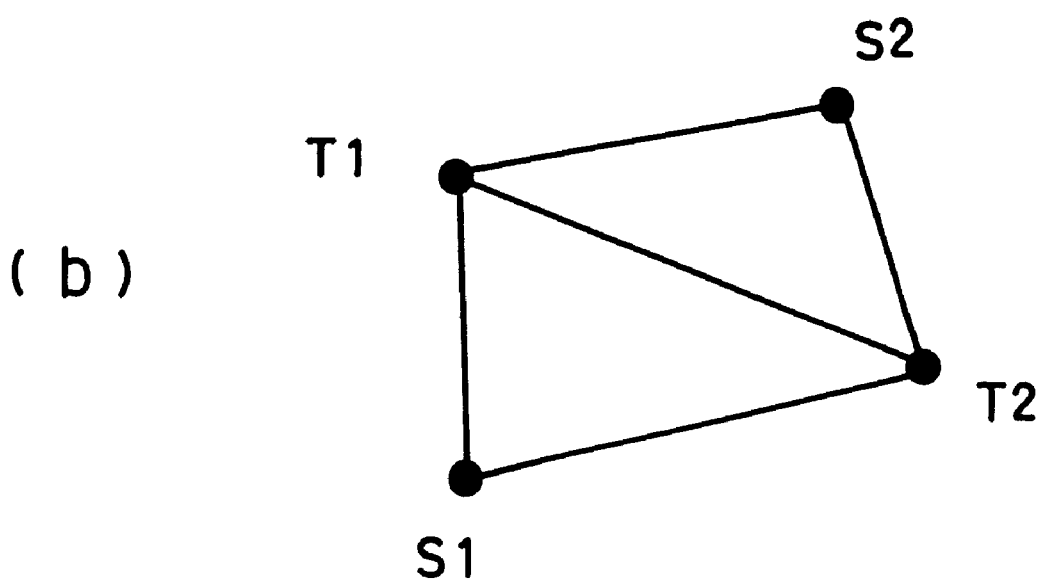

For example, let's assume that first the 3D model is obtained as the shape shown in FIG. 16(a). In FIG. 16(a), the points S1 and S2 are positioned in the front, whereas the points T1 and T2 are positioned in the back. Consequently, the faces T1–S1–S2 and T2–S1–S2, which are the adjacent triangular faces sharing the edge S1–S2, form a convex shape, in which the edge S1–S2 protrudes towards the front.

Assuming that this convex shape is not the 3D shape that was intended originally, it is possible to redefine the faces as shown in FIG. 16(b) with the edge that has not been recognized as an edge in the procedure for generating this convex shape, namely taking the edge T1–T2, indicated by the broken line in 16(a), as a new edge. Also in FIG. 16(b), the points S1 and S2 are still in front and the points T1 and T2 are still in the back, so that a concave shape can be recognized with the two triangular adjacent faces S1–T1–T2 and S2–T1–T2 sharing the edge T1–T2, which is drawn in the back.

If the adjacent two faces are not triangular, it is possible to change the definition of the faces to another configuration by rearranging the edges. In this case, the user should be provided with a function that sequentially presents a plurality of face configurations, based on the edges, so that the user can select one from a plurality of face configurations.

Moreover, a function should be provided for deleting a designated new vertex, when this new vertex is not necessary. In this case, after a new vertex has been designated that should be deleted, all the edges leading to this vertex are deleted, and the faces sharing this point are connected. If the polygon that is formed by connecting the faces does not lie within one plane in the 3D space, it is divided by connecting suitable vertices of the polygon. Since in this case a plurality of possibilities exists for such a division, the solutions are presented sequentially to the user, until the user picks the solution of his liking.

Then, a function should be provided for deleting a vertex of the base model, for the case that the base model has vertices that should not be included in the final shape. The deletion of vertices of the base model is performed in analogy to the deletion of new vertices.

It is also useful to provide a function for registering the resulting 3D model as a base model. Since the added vertices and face information follow the format of the base model, it then can be applied for the generation of a similar 3D model.

At last, the texture image generating device 810 generates a texture image, which is pasted on the faces of the 3D model, based on the relation between the final 3D model and the image, and the generated model output device 811 outputs the generated 3D model, after converting the data format to that of a 3D model display system.

The texture image is generated in accordance with the finally obtained face information, 3D coordinates of the vertices, and projection position towards the image. This means, the faces of the final 3D model of the given image information are converted when they are seen from their front side. If they can be seen partially on a plurality of images, they should be treated as front faces, and the texture image should be generated as an overlapping image. The conversion formula for this image information can be derived from the projection geometry and the parameters expressing the projection process.

In many cases, since the same face can be seen in a plurality of images, a plurality of texture images is obtained. Moreover, the surface areas differ as well, because such a face is seen from different directions in each screen. If a face is not viewed straight on but from an angle, then its displayed surface area becomes smaller, the smaller the angle is at which it is viewed, and the texture image appears extended, which worsens the resolution.

Consequently, it is also possible to generate a plurality of texture images taken from a plurality of viewpoints, and select the texture image with the highest resolution as a representative texture image. Moreover, it is also possible to combine the plurality of texture images and form the weighted average according to their resolution.

The information relating to the final 3D model obtained in this manner is made up of the coordinates of the vertices, the graphs of the vertices defining the edges and faces, and the texture image pasted on the faces. This information can be outputted in a pre-existing format, such as VRML (Virtual Reality Modeling Language).

Thus, according to this embodiment, it is possible to determine the shape of the 3D model while giving consideration to its relation with the texture, so that it is possible to restore a shape for a 3D scene with a natural 3D model without texture misalignments in the finished 3D model.

Figure 17:
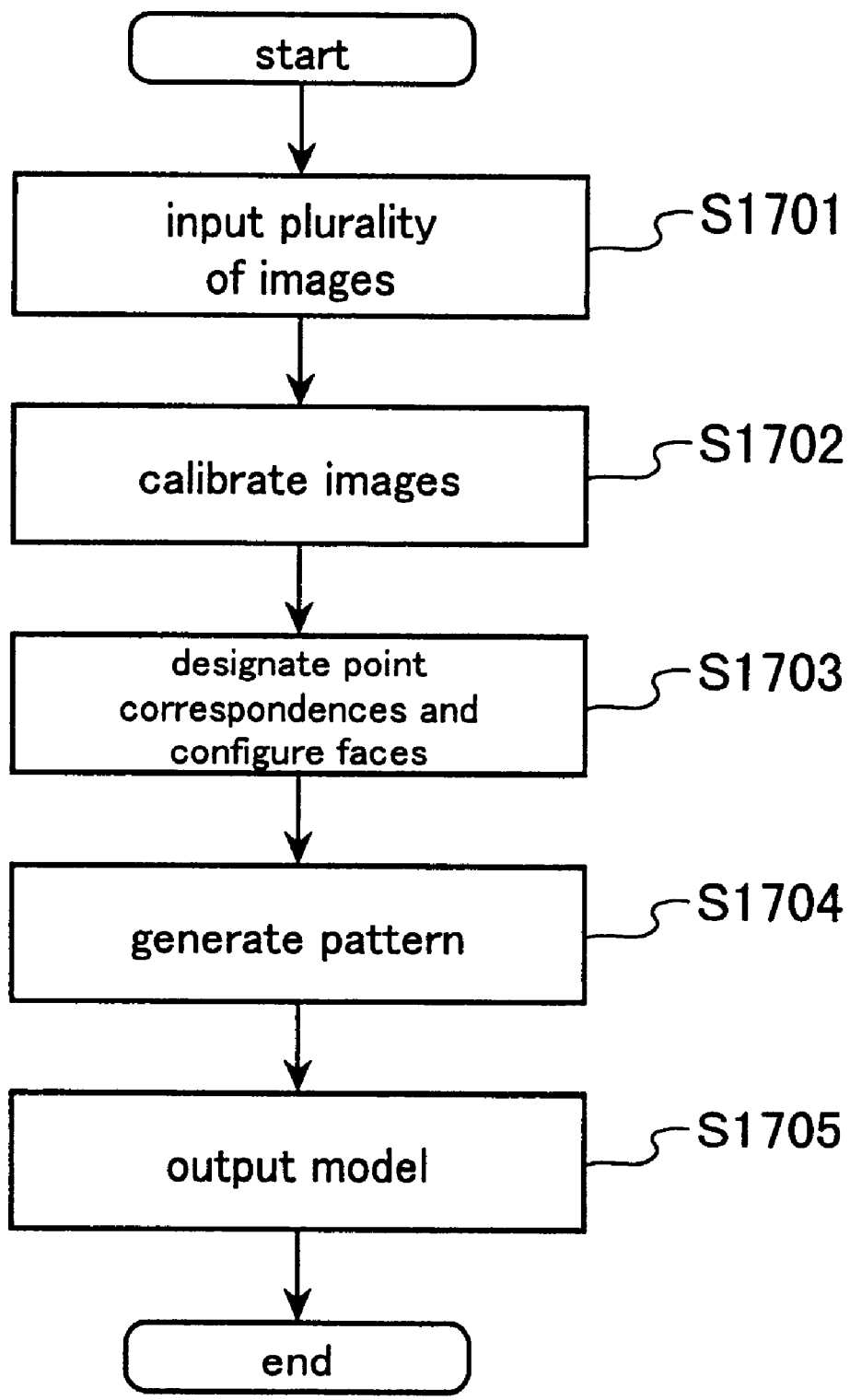
FIG. 17 is a flowchart in an embodiment of a 3D model conversion apparatus in accordance with the present invention.

The following is an explanation of the process flow in a program realizing an embodiment of a 3D model conversion apparatus in accordance with the present invention. FIG. 17 shows a process flowchart for a program realizing an embodiment of a 3D model conversion apparatus in accordance with the present invention.

As is shown in FIG. 17, after plurality of images serving as the target object are entered (step S1701), calibration of the images is performed, the external camera parameters and the internal camera parameters for the given images are determined, and the arrangement of the faces included in the base model on the images is determined (step S1702).

Then, points for which the user wants to establish a correspondence relation between the images are designated on the images, and faces are configured by connecting these designated points and a plurality of arbitrary points in the base model (step S1703). This operation is performed for all of the plurality of given images. At the same time, the 3D coordinates of the points designated on the images are calculated by triangulation.

At last, a texture image is generated to be pasted on a surface of the 3D model, based on a correspondence relation between the finally obtained 3D model and the images (step S1704), and is output after conversion into the data format of the 3D model display system (step S1705).

Figure 18:
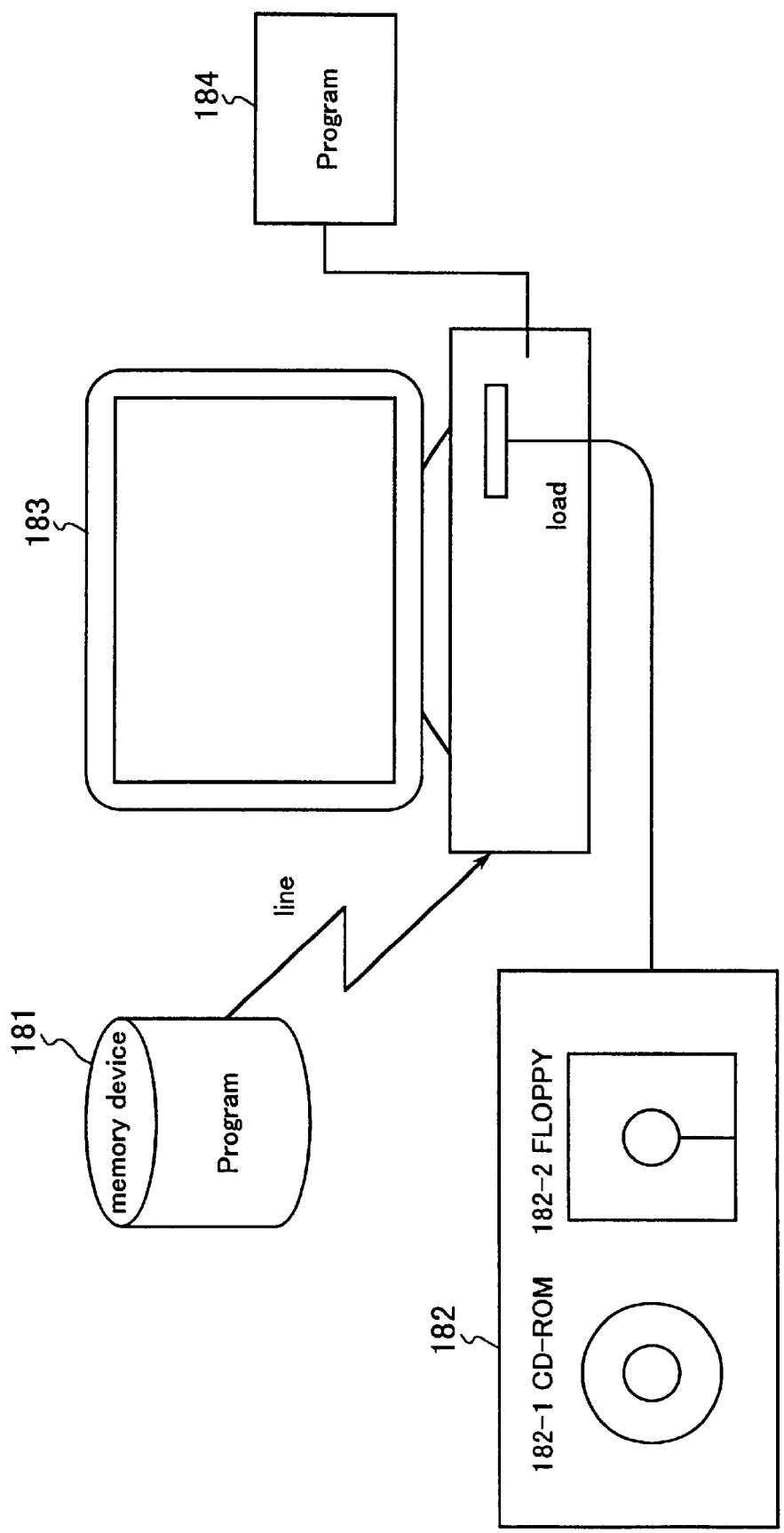
FIG. 18 is an illustrative diagram of examples of a recording medium.

FIG. 18 is an illustrative diagram of recording media storing a program for realizing an embodiment of the 3D model conversion apparatus of this invention. As shown in FIG. 18, such recording media can be not only portable recording media 182 such as a CD-ROM 182-1 or floppy disk 182-2, but also a memory device connected by a communication circuit, or a computer's hard disk or a RAM 184. To execute the program, the program is loaded and executed on the main memory.

Moreover, as shown in FIG. 18, the recording media storing the 3D model data generated with an embodiment of the 3D model conversion apparatus of this invention can be not only portable recording media 182 such as a CD-ROM 182-1 or floppy disk 182-2, but also a memory device connected by a communication circuit, or a computer's hard disk or a RAM 184, which can be read into a computer 183 when the 3D model conversion apparatus of this invention is used, for example.

The invention may be embodied in other specific forms without departing from the spirit or essential characteristics thereof The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A 3D model conversion apparatus for measuring the shape of a 3D body based on a plurality of images and converting it into a 3D model, the apparatus comprising:

an image input portion for reading in a plurality of the images;

an image storing portion for storing the images that have been read in;

a base model memory portion for storing base models expressing reference bodies included in the images;

a base model selecting portion for selecting a base model defining a geometric quality of a body in the images, which is to be converted;

an image calibration portion for performing a plurality of image calibrations based on the selected base model, and superimposing the base model on the images to determine 3D coordinates of vertices of the base model;

a face configuration and corresponding points designating portion for designating at least one new vertex on the images projected from at least two different points of view and configuring a surface, which is generated by designating the new vertices, based on the result of the image calibrations and the previously determined 3D coordinates of the vertices of the base model;

a 3D information calculation portion for calculating 3D positional information of the new vertices when the new vertices are being designated;

a 3D shape display portion for displaying a 3D model of the body, which is to be converted by adding the new vertices;

a texture image generating portion for generating a texture image to be pasted on a surface of the 3D model, based on a correspondence relation between the 3D model that is finally obtained by addition of the new vertices and the images;

a generated model output portion for outputting data of the completed 3D model.

2. The 3D model conversion apparatus according to claim 1, wherein a change or a deletion of the new vertices and the faces can be performed by rearranging edges between the vertices.

3. The 3D model conversion apparatus according to claim 1, wherein the base models can be read in with a data format using parameter variables.

4. The 3D model conversion apparatus according to claim 1, wherein the new vertices are expressed by a data format using parameter variables, and the values of the parameters are determined at a time of the calibration of the plurality of images.

5. The 3D model conversion apparatus according to claim 1, wherein a 3D model that is being converted can be registered as a base model.

6. A 3D model conversion method for measuring the shape of a 3D body based on a plurality of images and converting it into a 3D model, the method comprising:

reading in a plurality of the images, and storing the images that have been read in;

storing base models expressing reference bodies included in the images;

selecting a base model defining a geometric quality of a body in the images, which is to be converted;

performing a plurality of image calibrations based on the selected base model, and superimposing the base model on the images to determine 3D coordinates of vertices of the base model;

designating at least one new vertex on the images projected from at least two different points of view and configuring a surface, which is generated by designating the new vertices, based on the result of the image calibrations and the previously determined 3D coordinates of the vertices of the base model, and simultaneously calculating 3D positional information of the new vertices and displaying a 3D model of the body, which is to be converted by adding the new vertices;

generating a texture image to be pasted on a surface of the 3D model, based on a correspondence relation between the 3D model that is finally obtained by the addition of new vertices and the images; and outputting data of the completed 3D model.

7. A computer-readable recording medium storing a program, to be executed on a computer, for measuring the shape of a 3D body based on a plurality of images and converting it into a 3D model, the program comprising steps for:

reading in a plurality of the images, and storing the images that have been read in;

storing base models expressing reference bodies included in the images;

selecting a base model defining a geometric quality of a body in the images, which is to be converted;

performing a plurality of image calibrations based on the selected base model, and superimposing the base model on the images to determine 3D coordinates of vertices of the base model;

designating at least one new vertex on the images projected from at least two different points of view and configuring a surface, which is generated by designating the new vertices based on the result of the image calibrations and the previously determined 3D coordinates of the vertices of the base model, and simultaneously calculating 3D positional information of the new vertices and displaying a 3D model of the body, which is to be converted by adding the new vertices;

generating a texture image to be pasted on a surface of the 3D model, based on a correspondence relation between the 3D model that is finally obtained by the addition of new vertices and the images; and outputting data of the completed 3D model.

* * * * *